May 3, 1960 D. TIBBITS, JR 2,934,841
DITCHING MACHINE
Filed Feb. 11, 1958 3 Sheets-Sheet 2
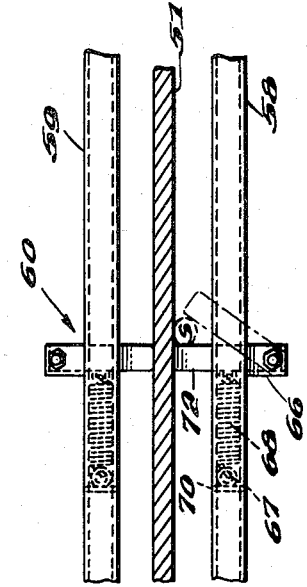
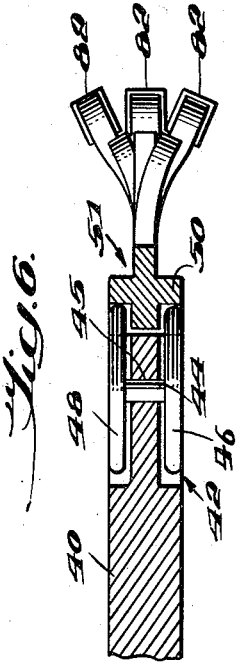
INVENTOR
DUANE TIBBITS, JR.
BY *Fisher, Christen & Gordon*
ATTORNEYS May 3, 1960

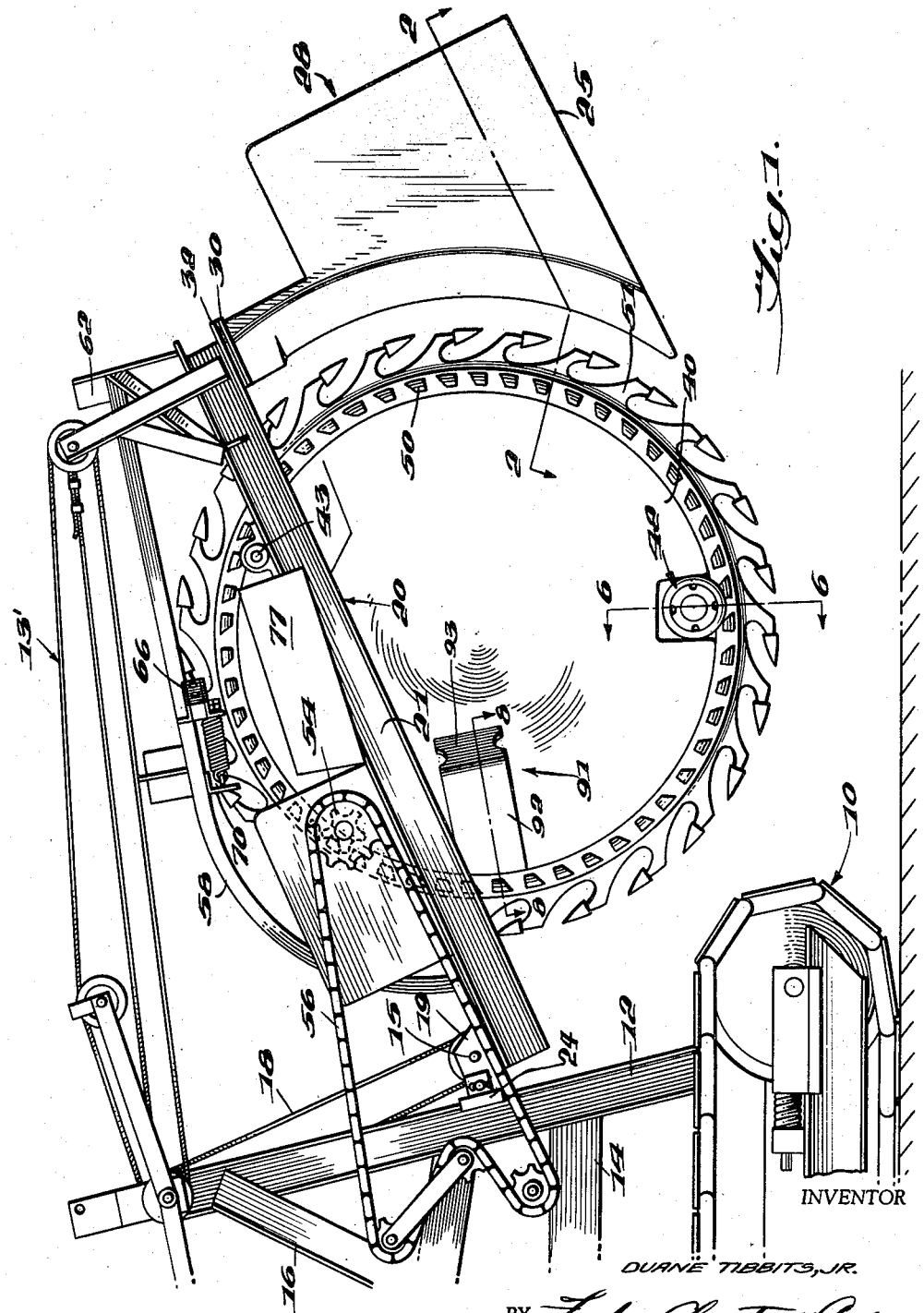

D. TIBBITS, JR 2,934,841

DITCHING MACHINE

Filed Feb. 11, 1958

INVENTOR
DUANE TIBBITS, JR.

BY
ATTORNEYS

United States Patent Office 2,934,841
Patented May 3, 1960

2,934,841
DITCHING MACHINE
Duane Tibbits, Jr., Birmingham, Mich.
Application February 11, 1958, Serial No. 714,656
4 Claims. (Cl. 37—94)

This invention relates to new and useful improvements in a ditching machine.

One object of this invention is to provide a high-speed ditching machine to greatly increase the speed with which telephone cables and the like may be buried.

Another object of this invention is to provide a machine which can be readily adapted to conventional track-laying vehicles or other suitable construction-type equipment.

Another object of this invention is to provide a high-speed ditching machine in which a minimum of earth is disturbed to accomplish a cable burying mission.

A still further object of the invention is a ditcher of the type described which can readily be controlled, raised, lowered, or tilted by an operator on the track-laying vehicle.

Another very important object of the invention is to provide a means for scraping adhering dirt accumulations from the digging means so that operation and maintenance difficulties will be held to a minimum.

Another object of the invention is to provide a ditch wall and pivoting retaining structure for a ditch.

In general, the objects of this invention are accomplished by the combination of a saw tooth digging means trailing a power-driven vehicle. Preferably, the saw tooth digging means includes a unitary power-driven rotating rim having outwardly extending saw teeth thereon. In the preferred construction, the rim surrounds a stationary disc having a portion adapted to be in the ditch being dug and a portion extending above the ground and the driving means for the rim is affixed at the top of the disc above the ground. In that form of the invention illustrated in the drawings, the power-driven vehicle is provided with a first frame extending upwardly therefrom and a second frame in the form of a boom extends rearwardly from the first frame for mounting the saw teeth digging means, and means are provided for raising and lowering the second frame with respect to the first frame.

Another important feature of the invention, both independently and in combination with the features just described, is the provision of a plow mounted at the rear of the boom for trailing the digging means and retaining the walls of the newly formed ditch. The plow includes a pair of plates having outer walls spaced apart the width of the ditch being dug. Preferably, the walls are connected along their leading edges by a wedge for wedging loose particles of earth into the walls of the ditch. Also in the preferred form of the invention, the leading edge of the plow takes the same general configuration as the rear edge of the digging means and trails very closely behind the digging means to catch loose dirt before it falls into the ditch.

Still another feature of this invention is the cleaning means provided for removing adhering particles from the saw teeth and rim. The cleaning means is mounted on the second frame above the earth level and includes a pair of spring-loaded fingers normally positioned closely adjacent the saw teeth. These fingers will normally remove adhering particles from the rotating rim but in the event that the particle is a rock so firmly lodged that an attempt to remove it might break a saw tooth, the fingers will yield in the direction of movement of the rim.

Other features of the invention will be better understood by reference to the following detailed description of the invention and the accompanying drawings, in which:

Figure 1 is a side elevational view showing the saw-tooth digging means, the retaining plow, and the associated track-laying vehicle;

Figure 2 is a sectional view along the lines 2—2 of Figure 1;

Figure 3 is a perspective view of the saw-tooth rim and driving cogs;

Figure 4 is a perspective view of the retaining plow;

Figure 5 is a top view of the cleaning mechanism just below the saw-teeth for easier viewing;

Figure 6 is a cross-sectional view of the tandem bearing mechanism along the line 6—6 of Figure 1;

Figure 7:
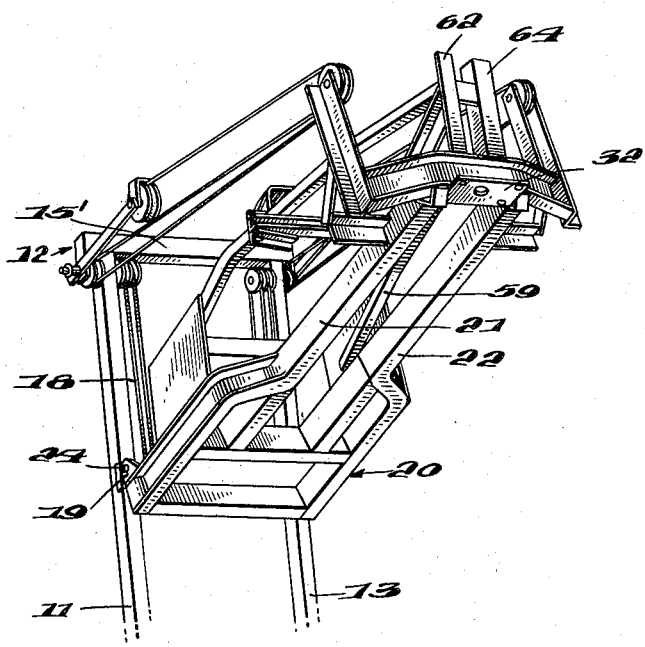
Figure 7 is a perspective view of the frame and control structure of the machine.
Figure 8:
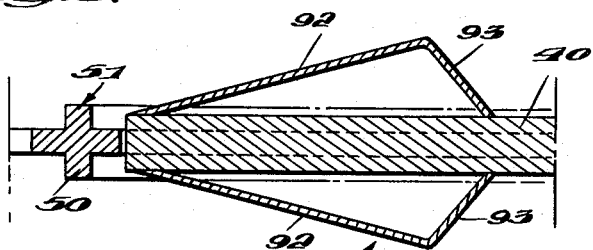
Figure 8 is a partial sectional view along the lines 8—8 of Figure 1.

In the drawings, 10 represents a conventional work vehicle, such as a bull-dozer or any other track-laying vehicle on which a main frame member 12 can be supported. Frame 12 is further supported by support members 14 and 16 which are welded to a first frame 12 and aid in securing it to the vehicle. The manner of securing frame 12 to the vehicle forms no part of this invention. The digging machine under discussion is capable of being mounted to most heavy construction vehicles, whether wheeled or track-laying.

As can best be seen in Figure 7, the frame member 12 consists of two upright channel members 11 and 13 and a cross member 15. Referring still to Figure 7, a boom 20 is adapted to slide along the flanges of frame members 11 and 13.

The machine as shown in Figure 1 moves to the left in operation. Thus, structure on the left will be described as forward elements and those on the right as rearward elements.

*The boom*

A second frame member in the form of a boom consists of two arms 21 and 22. The arm 21 has an extension 19 at its forward end formed integral therewith, and arm 22 has an integral extension 17 (not shown) which corresponds to extension 19. Pivotally mounted to extension 19 is an element 24 adapted to slide along the flanges of the vehicle mounted frame member 11, and pivotally mounted to extension 17 is element 26 (not shown) the equivalent of element 24, adapted to slide along the flanges of vehicle mounted frame member 13. This allows the boom 20 to be raised and lowered by operation of a conventional cable and pulley arrangement designated at 18 in Figure 1. This pulley arrangement can easily be designed to operate from a position in the vicinity of the driver of the track-laying vehicle.

The cable and pulley arrangement 18 is used to lower the boom 20 to the desired depth. The cable and pulley arrangement shown as 13' can then be used to allow the plow end of the boom to be lowered while leaving element 24 at the same position. In other words, the boom and all its superstructure is pivotable about point 15'. The operator can lower this end of the boom a distance whereby the boom is parallel to the ground.

By operating the cable system 18 in conjunction with the cable system 13', the depth and tilt of the entire boom structure may be regulated.

The cable systems, of course, are also used to raise the boom and its superstructure to the traveling position as shown in Figure 1.

The normal digging position would be with the boom 20 parallel to the top of the ground and low enough to the ground so that the bottom of the saw tooth rim 51 would be below the surface of the ground.

Digging means

The digging means consists of a circular disc member 40 and the circular saw tooth rim 51 mounted thereon. The circular disc member 40 is mounted securely between arms 21 and 22 for supporting the digging rim to be described. The circular disc 40 has two bearing means 42 securely attached to its bottom edge. A cross section of this bearing means is shown in Figure 6. The bearing means consists of an axle 44 which is inserted through axle slot 45 and two wheel members 46 and 48 mounted at each end of the axle. The wheel members are mounted so that their outer edges extend slightly beyond the periphery of disc member 40. This allows the wheels to contact the cogs 50 of the saw tooth rim 51 to be described below.

The rim 51 in the preferred embodiment is a unitary piece of steel with saw-tooth elements along its periphery. Referring to Figure 2, it can be seen that one tooth extends to the right, the next tooth straight out from the rim, and the next tooth to the left. This arrangement continues around the entire rim. The saw-teeth themselves are much like conventional saw-teeth but are uniquely adapted to their digging mission. Referring now to Figure 3, note that the teeth 80 have a sharp flat edge 81 on the caps 82. The caps 82 and shanks 85 may be formed integrally with the rim or have a removability feature in case of breakage.

The rim has an inner surface 83. Spaced between surface 83 and the saw-teeth are the cogs 50 by which the rim is driven. These cogs extend from both sides of the rim.

The saw-tooth rim 51 is mounted around the periphery of disc 40 and bears against the wheels 46 and 48. The cogs 50 are formed integral with the saw-tooth rim and are spaced evenly around both sides of the rim. The rim is rotated by gear members 54, which are securely mounted on the boom 20, the gears being driven by the power unit of the track-laying vehicle. The gear units 54 can be driven through any conventional gear and chain arrangement such as shown at 56 in Figure 1. Gear members 54 are adapted to mesh with the cogs 50 of the circular rim 51. The preferred embodiment of this drive mechanism would be to have a gear 54 on each side of the circular rim 51 so as to mesh with cogs 50 to drive the rim and stabilize it at the same time.

It has been found that the saw-tooth arrangement illustrated best in Figure 2 contributes greatly to the efficiency and speed of digging found in this new device. This particular digging means also cooperates especially well with the retaining wall plow to be described.

Referring to Figure 1, there can be seen a wheeled bearing means 43 to aid in supporting the saw-tooth rim. This bearing means is of a conventional type and provides a stabilizing effect to the rim. The rim 51, therefore, is supported at three points, that is, at gears 54, at tandem bearings 42, and at bearings 43. This triangular support structure reduces free-play between the disc and the rim to a minimum.

The cleaning mechanism

The mounting structure for the cleaning mechanism 60 can best be seen in Figures 1 and 7. Attached to the rearward end of boom 20 are two upright members 62 and 64. A rigid member 58, of a generally curved configuration, joins the forward end of arm 21 to upright member 62. A member 59, of the same configuration as 58, joins the forward end of arm 22 to the upright member 64. A portion of the cleaning mechanism 60 is mounted on each of the members 58 and 59. A top view of the cleaning mechanism is shown in Figure 5. The teeth of the rim are not shown so that the drawing will have greater clarity. Only one side of the cleaning mechanism will be described because the other side works in exactly the same manner.

An angle iron 70 is mounted on member 58 near the top of rim 51. A short distance from angle iron 70 is another angle iron 66 welded to member 58. Pivotally mounted on angle iron 66 is a bar 72 extending to a point adjacent the rim 51. The bar 72 is also connected to a spring 68 and is spring urged to a position normal to the plane of rim 51. The spring 68 is further secured to member 70. If a stone (S) is adhering to the rim, it will strike the cleaning bar 72 and become dislodged. If it will not dislodge, the spring arrangement allows it to pass without stopping the entire mechanism or breaking a tooth. This function is shown in dotted lines in Figure 5.

Plates 77 on both sides of disc 40 are secured at an outwardly and downwardly angle to the disc. Any foreign matter, falling from the cleaning mechanism, will strike these plates and be deflected away from the machine.

The plow

Closely following the rim 51 is plow member 28. The plow member consists of two parallel plates 29 and 31. At a point near the rim, these members angle toward each other forming a wedge comprising elements 35 and 37. Where the elements join is formed an edge 33. In Figure 1, it is shown how edge 33 is curved to the same configuration as the rim 51 and is spaced several inches from the rim.

Wedge elements 35 and 37 have an extension 39 which extends upwardly from the plow. At the top of 39 is welded a plate 30 approximately perpendicular to the plane of plow 28. Normal to this plate is a stud 39' which is adapted to fit into a centrally disposed opening provided for it in member 32. The plow is securely but pivotally mounted to member 32 by this stud 39'. This feature allows the plow to readily follow a curved path of the machine. Note the corner holes 41 in the plate 30 which are adapted to match up with like holes on member 32. By inserting a bolt through these holes, the plow can be made non-pivoting for traveling or straight line digging.

Plow 28 has a bottom edge 25 that will be at the same depth as the bottom of rim 51 when the boom 20 is lowered to its parallel to the ground position.

An auxiliary plow function is performed by members 91 that extend from both sides of disc 40. The member 91 consists of a plate 92 gradually sloping outwardly from the edge of disc 40 and terminating at element 93 which angularly returns to the disc 40. This auxiliary plow allows for a firming of the top edge of the ditch immediately after it has been cut by the rim 51.

In operation, the machine as shown in Figure 1, moves to the left. The operator applies power to the gear and chain mechanism 56 and the saw-tooth rim begins to rotate. The boom 20, with its superstructure, is lowered and tilted into the ground the desired distance. The rim will dig a narrow trench and the plow 28 will retain the walls of this trench for a period long enough to place a cable between the members 29 and 31. The cable can be fed continuously to the ditch as the machine moves to the left.

Much of the dirt retained by plow member 28 will fall back into the ditch as the plow moves forward. This leaves a minimum of dirt to be handled in filling the ditch.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:

1. A ditching machine comprising a vehicle, a power means to advance said vehicle, a frame, a generally circular disc fixed in a vertical plane to said frame member, bearing means mounted on said disc, a unitary saw-tooth ditching rim supported by said disc and contacting said bearing means, the teeth of said rim arranged in a plurality of series, each series having a tooth lying in the plane of said rim, a tooth angling to one side of said rim and a tooth angling to the opposite side of said rim, a drive means to rotate said rim about the periphery of said disc for cutting a ditch having side walls as the machine advances, firming means mounted on said disc to firm the top edge of said ditch, a retaining plow mounted on said frame and having two plates joined on a line adjacent and following the contours of a portion of said rim, and cleaning means mounted adjacent said rim whereby said cleaning means removes foreign matter from said rim as it rotates.

2. A ditching machine comprising a vehicle, a power means to advance said vehicle, a frame, a generally circular disc fixed in a vertical plane to said frame member, bearing means mounted on said disc, a unitary saw-tooth ditching rim supported by said disc and contacting said bearing means, the teeth of said rim arranged in a plurality of series, each series having a tooth lying in the plane of said rim, a tooth angling to one side of said rim and a tooth angling to the opposite side of said rim, a drive means to rotate said rim about the periphery of said disc for cutting a ditch having side walls as the machine advances, firming means mounted on said disc to firm the said disc and sloping outwardly on both sides therefrom, a retaining plow mounted on said frame and having two plates joined on a line adjacent and following the contours of a portion of said rim, said plow being pivotally mounted on an axis which lies generally perpendicular to the ground.

3. A ditching machine comprising a vehicle, a power means to advance said vehicle, a frame, a generally circular disc fixed in a vertical plane to said frame member, bearing means mounted on said disc, a unitary saw-tooth ditching rim supported by said disc and contacting said bearing means, the teeth of said rim arranged in a plurality of series, each series having a tooth lying in the plane of said rim, a tooth angling to one side of said rim and a tooth angling to the opposite side of said rim, a drive means to rotate said rim about the periphery of said disc for cutting a ditch having side walls as the machine advances, firming means mounted on said disc to firm the top edge of said ditch and a retaining plow mounted on said frame and having two plates joined on a line adjacent and following the contours of a portion of said rim, said plow being pivotally mounted on an axis which lies generally perpendicular to the ground, spring-biased cleaning bars mounted adjacent said rim whereby said bars scrape foreign matter from said rim as the rim is rotated.

4. A ditching machine comprising a vehicle, a power means to advance said vehicle, at least one support member mounted on said vehicle, a frame member pivotally and slidably mounted on a side leg of said support member, bearing means mounted on said frame member, a saw-tooth ditching rim supported by said bearing means, the teeth of said saw-tooth rim arranged in a plurality of series about the periphery thereof, each series having a tooth lying in the plane of said rim, a tooth angling to one side of said rim and a tooth angling to the opposite side of said rim, a drive means to rotate said rim about the periphery of said disc for cutting a ditch having side walls as the machine advances, firming means mounted on said bearing means to firm the top edge of said ditch and a retaining plow mounted on said frame and having two plates joined on a line adjacent and following the contours of portions of said rim, said plates being spaced along their lengths an amount approximately equal to the width of one of said series, and said plow being pivotally mounted on an axis which lies generally perpendicular to the ground, spring-biased cleaning bars adjacent said rim whereby said bars scrape foreign matter from said rim as the rim is rotated.

References Cited in the file of this patent

UNITED STATES PATENTS

| | | |
|---|---|---|
| 285,206 | Barnes | Sept. 18, 1883 |
| 304,776 | Barnes | Sept. 9, 1884 |
| 340,614 | Powers | Apr. 27, 1886 |
| 375,602 | Carr | Dec. 27, 1887 |
| 1,073,227 | Funk | Sept. 16, 1913 |
| 1,199,366 | French | Sept. 26, 1916 |
| 1,246,524 | Bager | Nov. 13, 1917 |
| 1,521,236 | Franks | Dec. 30, 1924 |
| 1,911,615 | George | May 30, 1933 |
| 2,165,299 | Penote | July 11, 1939 |
| 2,241,383 | Barnett | May 13, 1941 |
| 2,280,021 | Askue | Apr. 14, 1942 |
| 2,654,966 | Askue | Oct. 13, 1953 |
| 2,684,542 | Larson et al. | July 27, 1954 |
| 2,711,035 | Pitts | June 21, 1955 |
| 2,815,726 | Davenport | Dec. 10, 1957 |

FOREIGN PATENTS

| | | |
|---|---|---|
| 144,926 | Austria | Mar. 10, 1936 |